US011875372B2

(12) United States Patent
Mirarchi et al.

(10) Patent No.: US 11,875,372 B2
(45) Date of Patent: Jan. 16, 2024

(54) SYSTEMS AND METHODS FOR AN INTERACTIVE ONLINE PLATFORM

(71) Applicant: Fortunito, Inc., San Francisco, CA (US)

(72) Inventors: Valerio Mirarchi, Trezzano sul Naviglio (IT); Giovanni Mirarchi, Trezzano sul Naviglio (IT)

(73) Assignee: Fortunito, Inc., San Francisco, CA (US)

( * ) Notice: Subject to any disclaimer, the term of this patent is extended or adjusted under 35 U.S.C. 154(b) by 12 days.

(21) Appl. No.: 16/831,587

(22) Filed: Mar. 26, 2020

(65) Prior Publication Data

US 2020/0311754 A1    Oct. 1, 2020

Related U.S. Application Data

(60) Provisional application No. 62/826,248, filed on Mar. 29, 2019.

(51) Int. Cl.
*G06Q 30/00* (2023.01)
*G06Q 30/0207* (2023.01)
(Continued)

(52) U.S. Cl.
CPC ..... *G06Q 30/0212* (2013.01); *G06Q 30/0272* (2013.01); *H04L 63/0853* (2013.01)

(58) Field of Classification Search
None
See application file for complete search history.

(56) References Cited

U.S. PATENT DOCUMENTS

| 3,069,632 A | * | 12/1962 | Sterzer | G06F 7/588 |
| | | | | 331/165 |
| 4,669,730 A | * | 6/1987 | Small | A63F 3/081 |
| | | | | 463/17 |

(Continued)

FOREIGN PATENT DOCUMENTS

| AU | 2013213728 A1 | * | 8/2013 | | G06F 17/32 |
| WO | WO-2006029297 A2 | * | 3/2006 | | G06Q 20/308 |
| WO | WO-2011149558 A2 | * | 12/2011 | | G06Q 40/12 |

OTHER PUBLICATIONS

* Microsoft. Authentication—Login With Game Center. (Mar. 6, 2019). Retrieved online Dec. 28, 2021. https://docs.microsoft.com/en-us/rest/api/playfab/client/authentication/login-with-game-center?view=playfab-rest (Year: 2019).*

(Continued)

*Primary Examiner* — James A Reagan
(74) *Attorney, Agent, or Firm* — Carr & Ferrell LLP

(57) ABSTRACT

Systems and methods for an interactive online platform are described herein. A method includes receiving a participation request from the content deployment platform that includes a participation identifier and an authentication token. The participation identifier is indicative of a current view number of an advertisement presented to the user. The method includes validating the authentication token, determining that a user is a winner or loser based on the participation identifier matching a pre-selected participation number for the advertisement, and transmitting a message to the content deployment platform to inform the user that the user is a winner or a loser.

17 Claims, 11 Drawing Sheets

(51) Int. Cl.
  H04L 9/40 (2022.01)
  G06Q 30/0272 (2023.01)

(56) References Cited

U.S. PATENT DOCUMENTS

| | | | | |
|---|---|---|---|---|
| 4,815,741 | A * | 3/1989 | Small | A63F 3/081 463/17 |
| 8,015,117 | B1 * | 9/2011 | Lillibridge | G06Q 30/02 705/64 |
| 8,984,292 | B2 * | 3/2015 | Lind | G06F 21/316 713/182 |
| 9,705,895 | B1 * | 7/2017 | Gutzmann | H04L 63/1408 |
| 9,773,376 | B2 * | 9/2017 | Rajput | G07F 17/3251 |
| 9,990,487 | B1 * | 6/2018 | Bailey | G06F 21/36 |
| 10,007,776 | B1 * | 6/2018 | Bailey | H04L 63/10 |
| 10,127,373 | B1 * | 11/2018 | Bailey | H04L 63/083 |
| 10,791,222 | B2 * | 9/2020 | Jiron | H04M 3/5183 |
| 11,210,674 | B2 * | 12/2021 | Novick | G06Q 20/4016 |
| 2002/0065690 | A1 * | 5/2002 | Kusumoto | G06Q 10/063 705/7.34 |
| 2004/0092311 | A1 * | 5/2004 | Weston | A63F 13/80 463/42 |
| 2006/0287963 | A1 * | 12/2006 | Steeves | G06Q 30/06 705/64 |
| 2008/0091518 | A1 * | 4/2008 | Eisenson | G06Q 30/02 705/14.64 |
| 2008/0244700 | A1 * | 10/2008 | Osborn | G06F 21/36 726/2 |
| 2009/0104965 | A1 * | 4/2009 | House | G06Q 20/3674 463/20 |
| 2011/0320822 | A1 * | 12/2011 | Lind | G06F 21/316 713/182 |
| 2012/0066067 | A1 * | 3/2012 | Curtis | H04W 4/023 705/14.66 |
| 2014/0200062 | A1 * | 7/2014 | Paradise | A63F 13/00 463/16 |
| 2014/0304505 | A1 * | 10/2014 | Dawson | G06F 21/6227 713/165 |
| 2014/0344927 | A1 * | 11/2014 | Turgeman | G06F 21/31 726/22 |
| 2015/0170473 | A1 * | 6/2015 | Hematji | G06Q 20/4012 463/25 |
| 2016/0191554 | A1 * | 6/2016 | Kaminsky | H04L 63/1425 726/23 |
| 2017/0090569 | A1 * | 3/2017 | Levesque | G06F 21/36 |
| 2017/0106290 | A1 * | 4/2017 | Pierce | A63F 13/792 |
| 2018/0314816 | A1 * | 11/2018 | Turgeman | G06F 21/40 |
| 2019/0220863 | A1 * | 7/2019 | Novick | G06Q 20/10 |
| 2019/0222607 | A1 * | 7/2019 | Thatha | G06F 15/16 |
| 2019/0394333 | A1 * | 12/2019 | Jiron | G06F 21/45 |
| 2020/0027302 | A1 * | 1/2020 | Petersen | G07F 17/3262 |
| 2020/0043278 | A1 * | 2/2020 | Gotlieb | G07F 17/42 |
| 2020/0117690 | A1 * | 4/2020 | Tran | G06F 16/90332 |
| 2020/0273040 | A1 * | 8/2020 | Novick | G06Q 20/10 |
| 2022/0108319 | A1 * | 4/2022 | Novick | G06Q 20/10 |

OTHER PUBLICATIONS

• EPICGAMES. Auth Interface—Interface to handle verification of user accounts, including login and logout functionality. (Mar. 20, 2019). Retrieved online Dec. 28, 2021. https://dev.epicgames.com/docs/services/en-US/EpicAccountServices/AuthInterface/index.html (Year: 2019).*

Kurt Alfred Kluever. "Evaluating the usability and security of a video CAPTCHA." (2008). Retrieved online Sep. 5, 2022. https://www.cs.rit.edu/~rlaz/files/Kluever-MSCThesis.pdf (Year: 2008).*

* cited by examiner

SYSTEMS AND METHODS FOR AN INTERACTIVE ONLINE PLATFORM

CROSS-REFERENCE TO RELATED APPLICATIONS

This application claims the benefit and priority of U.S. Provisional Application Ser. No. 62/826,248, filed on Mar. 29, 2019, which is hereby incorporated by reference herein, including all references and appendices, for all purposes.

FIELD OF THE PRESENT TECHNOLOGY

The present disclosure relates to the technical field of online content delivery platforms (e.g., interactive online platforms). In some embodiments, the systems and methods disclosed herein can allow a user to participate in a game during the presentation of content to the user.

SUMMARY

The present disclosure can include a method comprising: receiving a participation request from the content deployment platform that includes a participation identifier and an authentication token, wherein the participation identifier is indicative of a current view number of an advertisement presented to the user; validating the authentication token; determining that a user is a winner or loser based on the participation identifier matching a pre-selected participation number for the advertisement, and transmitting a message to the content deployment platform to inform the user that the user is a winner or a loser.

The present disclosure can include a system comprising: a processor; and a memory for storing instructions, the processor executing the instructions to receive a participation request from the content deployment platform that includes a participation identifier and an authentication token, wherein the participation identifier is indicative of a current view number of an advertisement presented to the user; validate the authentication token; determine that a user is a winner or loser based on the participation identifier matching a pre-selected participation number for the advertisement and transmit a message to the content deployment platform to inform the user that the user is a winner or a loser.

The present disclosure can include a method comprising: generating a plurality of pre-selected winning numbers for an advertisement, each of the plurality of pre-selected winning numbers corresponding to unique user requests for the advertisement, the plurality of pre-selected winning numbers being a subset of a set of participation numbers for the advertisement; receiving a request for content from a user device; providing the advertisement to the user device in response to the content request; receiving a participation request that includes a participation identifier that is indicative of a current view number for the advertisement; determining that the participation identifier matches one of the plurality of pre-selected winning numbers, and transmitting a message to the user indicating that the user is a winner of a prize.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1A:
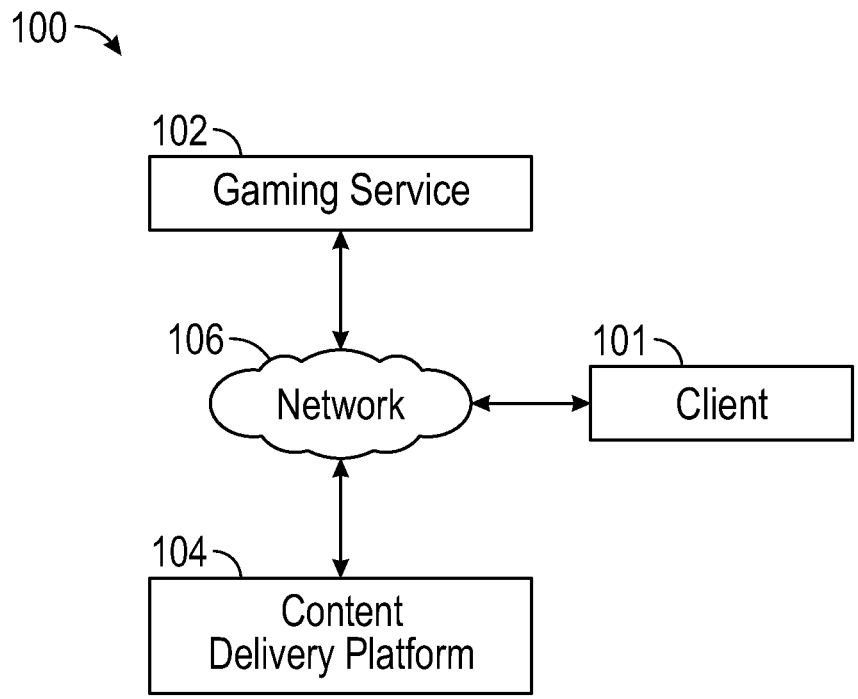
FIGS. 1A-1D each individually depict an illustrative architecture in which techniques and structures for providing the systems and methods disclosed herein may be implemented.

Generally, the present disclosure includes systems and methods that allow a user to participate in a game in combination with the presentation of content such as an advertisement. The ability to play the game can be predicated upon completely consuming the advertisement, such as viewing, listening, playing of the advertisement. Related content and advertisements can be provided by a website or application. A game can be interjected or embedded into a content player of a website in one embodiment. In another embodiment, the game can be incorporated into a mobile application or voice service. Example games disclosed herein can include, but are not limited to, sweepstakes, drawings, lotteries, and/or other similar games of chance or luck.

For context, online video/audio advertising platforms and services often experience poor completion rates and high blocking rates by users, even if related ads are well targeted to the right audiences. The online advertising experience can be significantly improved if it is directly linked with an emotional experience such as a game of chance. For example, the user can participate in a free-to-enter contest with prizes after consuming an advertisement.

The systems disclosed herein provide an interactive online platform that enables users to try their luck and participate in a game for free any time they are watching/listening to an online video/audio commercial break. Authenticated users have the chance to win prizes of varying value or significance without any additional effort required from the user above the one already made to watch and/or listen to an online commercial break or another advertisement.

To enter the contest the user can initially complete a process of authentication, complete various configuration steps, and view or listen to an advertisement in its entirety.

When the advertisement is complete, a participation number can be assigned to that user. A participation number for a user can be assigned relative to the advertisement. For example, if the user is the tenth person to view a video advertisement, the user would be assigned a participation number of ten. The number can be checked by a backend system and compared to a list of pre-defined numbers recorded on a backend database to define if that sequential number corresponds to a prize. If a match is found, a graphical user interface (GUI) can be generated and populated with a message that informs the user that they are a winner, along with a prize description. Otherwise, a follow-on message can be displayed that prompts the user to attempt to try again soon.

Some embodiments include a mobile device application, a website, a set-top-box, a video service appliance or dongle that interfaces with a television, a smart television, or a voice command service. Game logic can also be enabled or integrated into a third-party application, website, or voice command service that leverages a gaming service API (application programming interface) that links to a gaming backend service.

Systems and methods of the present disclosure can create a direct and unique link between where a game can be deployed at the end of an advertisement consumed by an online user. As noted above, the game can include a free-to-enter contest hosted and running on the gaming service/backend.

Turning now to the drawings, FIG. 1A depicts an illustrative architecture 100 in which techniques and structures of the present disclosure may be implemented. The architecture 100 can include a gaming service 102, a content deployment platform 104, and a network 106. A client 101 can receive content, advertisements, and gaming experiences through either or both of the gaming service 102 and the content deployment platform 104. The network 106 may include any one or a combination of multiple different types of networks, such as cable networks, the Internet, cellular networks, wireless networks, and other private and/or public networks. In some instances, the network 106 may include cellular, Wi-Fi, or Wi-Fi direct. In other embodiments, components of the environment can communicate using short-range wireless protocols such as Bluetooth, near-field, infrared, and the like.

In general, the content deployment platform 104 can cooperate with the gaming service 102 to provide both an advertisement (as well as other content) in combination with a gaming experience. Specific configurations of the content deployment platform 104 are illustrated in FIGS. 1B-1D.

Figure 1B:
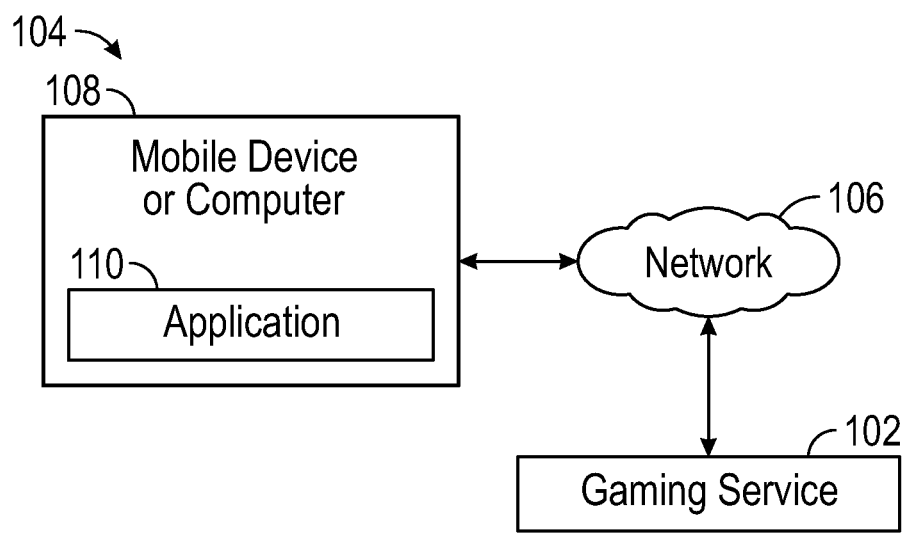

In FIG. 1B, the content deployment platform 104 can include a user device such as a mobile device or computer 108. The gaming service 102 can provide gaming features through a mobile application 110 that can be installed on the mobile device or computer 108.

Figure 1C:
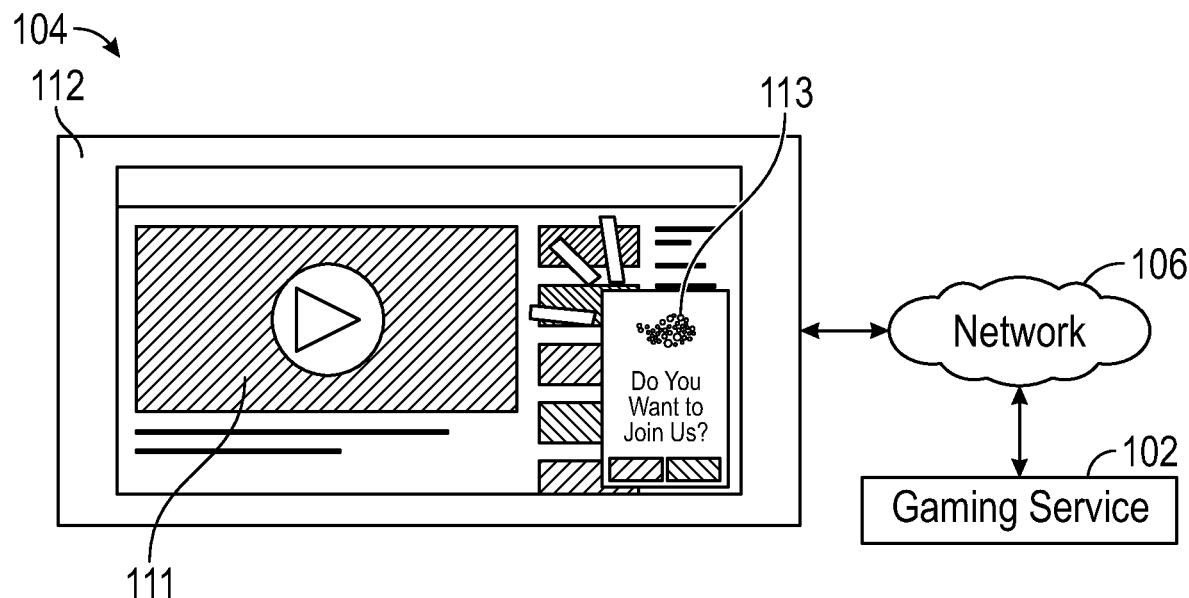
Figure 1D:
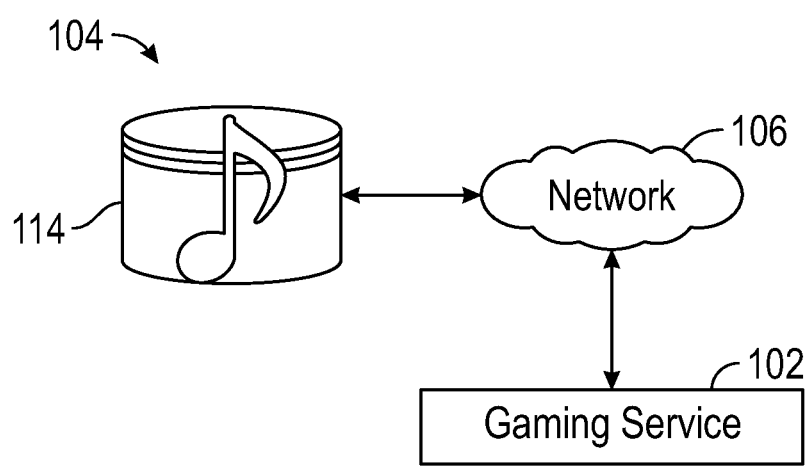

In FIG. 1C, the content deployment platform 104 can include a website 112 facilitated by a server or cloud service, for example. The website can be managed by a merchant or the gaming service 102. The gaming service 102 can provide gaming features through a website 112 operated by the gaming service 102. The website 112 can include a content player 111 and the gaming service 102 can provide a gaming interface 113 in association with the website 112. An example use case involving a website is illustrated in FIGS. 3A-3D.

In one embodiment, a merchant website (an example content delivery platform) can embed a content player that allows for use of a gaming experience provided by the gaming service 102. The gaming service 102 can select and serve advertisements or content through the content player. The content player can be provided by the gaming service 102, the content deployment platform 104, or a third party. When the content player is provided by the gaming service 102, the gaming service 102 can control the content/advertisement provided through the content player. In some instances, the content deployment platform 104 and gaming service 102 can coordinate to determine what content type is delivered. In some embodiments, targeted content can be delivered through the content player. In yet other embodiments, the content player can be provided by a third party, where the merchant website embeds code that integrates the content player. In some instances, the third party and the gaming service 102 can cooperate to include the gaming experience offered by the gaming service 102 into the content player provided by third party on the merchant website. To be sure, a plurality of deployment options can be facilitated in accordance with the present disclosure.

Figure 4:
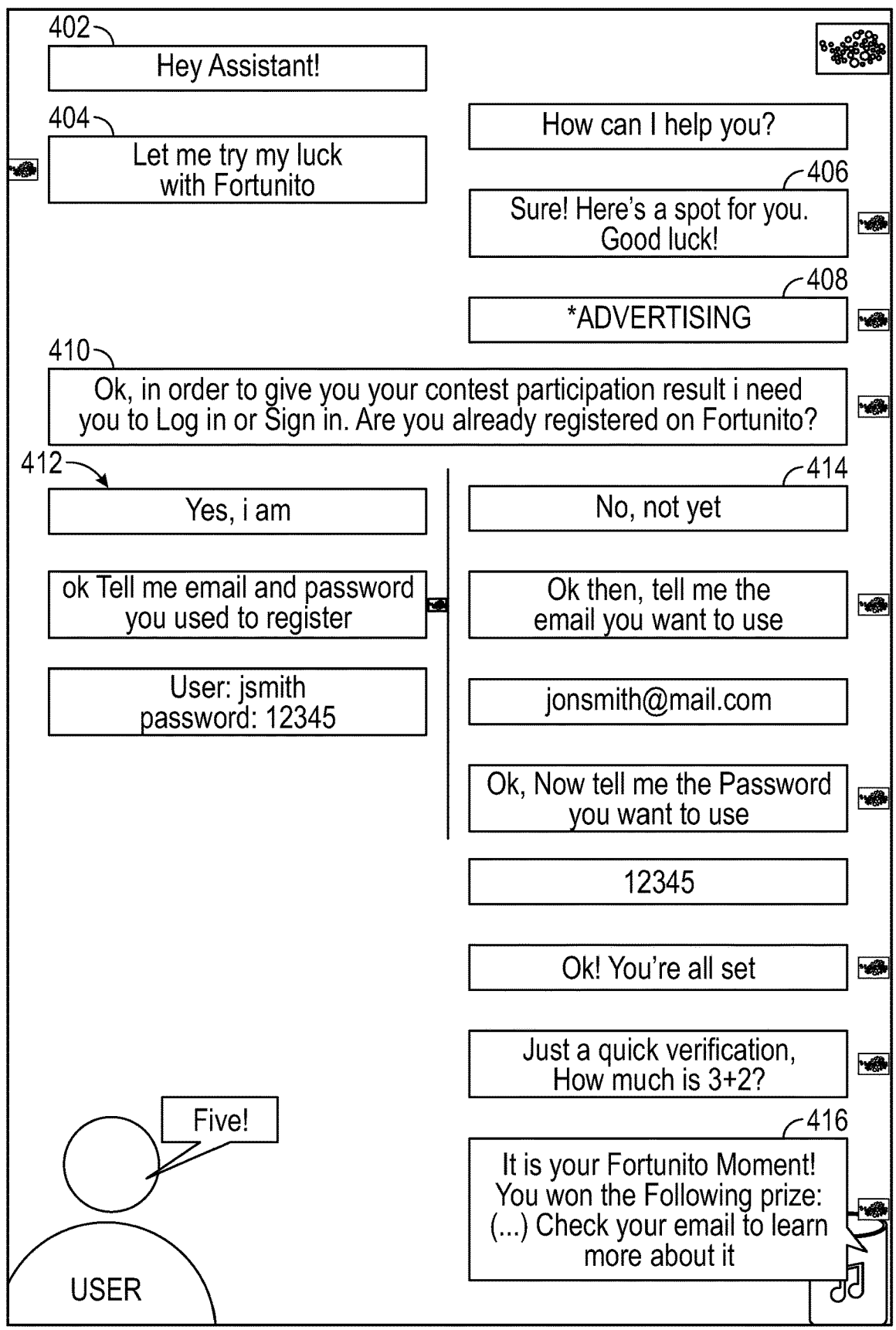
FIG. 4 illustrates an example voice service-related embodiment where an advertisement and gaming experience is delivered to a user.

In FIG. 1D, the content deployment platform 104 can include a voice service 114. The gaming service 102 can provide gaming features through the voice service 114. The website 112 and voice service 114 are also example implementations of a content deployment platform. An example use case involving a voice service is illustrated in FIG. 4.

In some embodiments, integration between the content deployment platform 104 and the gaming service 102 can be enabled using a software development kit (SDK) provided by the gaming service 102. In other embodiments, integration between the content deployment platform 104 and the gaming service 102 can be enabled using an application programming interface (API).

Regardless of the deployment, the content deployment platform 104 and the gaming service 102 can cooperate to provide content delivery in combination with a gaming experience. In some instances, the gaming service 102 can provide both the content delivery and the gaming experience through any of the merchant deployment types.

Figure 2:
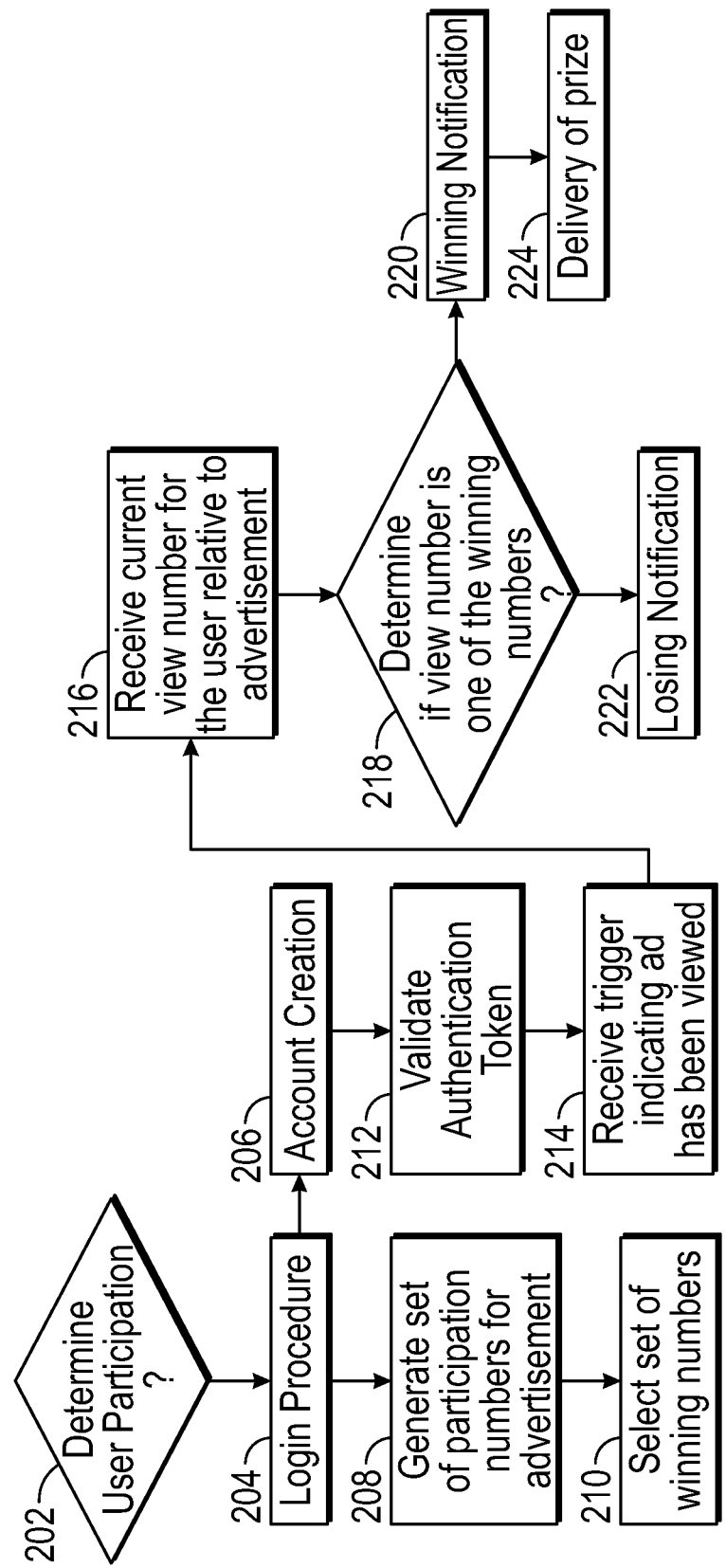
FIG. 2 is a flowchart of an example method of the present disclosure.

Referring now to FIGS. 1 and 2 collectively, regardless of the deployment method or mechanism, the gaming service 102 can facilitate a gaming experience that is coupled with the delivery of content to a user. Generally speaking, the gaming experience can be delivered in any context where content is being delivered to the user. For purposes of brevity, content can be delivered on any content delivery platform that can include a website, a content player, a voice service, and the like.

Content such as a video advertisement can be delivered to a user through a content delivery platform. Prior to or during content delivery, the gaming service 102 can cooperate with the content delivery platform to allow a user to select if the user would like to participate in a gaming experience in step 202. The gaming experience can include a game of chance. If the user desires to participate, the user may be requested to perform a login procedure in step 204. If the user does not have an account registered with the gaming service 102, the user can be prompted to create an account in step 206. When creating a new account, the user can provide demographic or personal preference information that can be stored in their account. The login process can be facilitated using pop-ups, frames, and so forth. When the content delivery platform includes a voice service, the user can log in using natural language commands.

Prior to or during content presentation, the gaming service 102 can generate a set of participant numbers corresponding to select winners and losers of a gaming experience in step 208. In some embodiments, winners of a gaming experience can be pre-selected using the set of participation numbers. The set of participation numbers correlate to users who consume the content delivered to them in its entirety. In one use case, a video advertisement can be served to users through the content delivery platform such as a content player of a website or an application residing on a mobile device or another similar user device. The gaming service 102 can select a list of winning numbers from the set of participation numbers in step 210. For example, a list of winning participation numbers can be randomly selected from a set of participation numbers such as from 1 to 500. The gaming service 102 can randomly select winning participation numbers from the set of participation numbers such as 34, 493, 339, and so forth. That is, the contest is based on the video advertisement being viewed up to five hundred times. A predetermined number of winning participation numbers can be selected from the set of participant numbers as noted above.

To be sure, in some embodiments, steps 208 and 210 occur prior to step 202. That is, the set of available view (e.g., participation) numbers for an advertisement and the subset of selected numbers (e.g., winning participation numbers) from the available view numbers are pre-selected prior to presenting the advertisement. In other embodiments, the winning participation numbers can be selected on the fly or in real-time in response to a request for an advertisement. A count can be maintained of the number of times the video has been viewed either by the content delivery platform or by the gaming service. A random number generator can be used to select one or more numbers. If the current view number matches the one or more numbers selected by the random number generator, the user is a winner.

When the user is logged in and authenticated, the user can be provided with an authentication token from the gaming service 102. When the user has logged in and has indicated that they would like to participate in a gaming experience, the gaming service 102 can receive a participation request that includes the authentication token in step 212.

In some embodiments, the user can participate in the gaming experience at an end of the video advertisement. To be sure, the gaming experience can be delivered at any time during the video advertisement, but in instances where the gaming experience is delivered at the end of the video advertisement, the content delivery platform can transmit a signal or message to the gaming service 102 that indicates that the end of the video advertisement has occurred. This signal or message acts as a trigger to execute the gaming experience. The gaming service 102 can receive the trigger from the content delivery platform in step 214. Once the trigger is received, the gaming experience is initiated. The trigger could include a specific code or routine that indicates that the advertisement has been completely consumed. The trigger could indicate that an advertisement is over or that an advertising break is complete. For example, when a user is watching a movie through the content delivery platform, the content delivery platform or third-party service can interject an advertising break into the movie. The user can be presented with an offer to play a game and a login request by the gaming service. When the user is authenticated, the advertising break is presented. At the end of the advertising break, the gaming service can determine if the user is a winner by matching a participation identifier (e.g., contest identifier) for the user to a pre-generated list of winning participation numbers. When a match is found, the user is notified through a user interface provided on the content delivery platform.

In some embodiments, all aspects of the game are executed at the gaming service 102 level. For example, prior to receiving a trigger that an advertisement or advertisement break is complete, the gaming service 102 can generate a pre-determined list of winning participant numbers. When the user is authenticated and when the advertisement or advertisement break is complete, the gaming service 102 can determine if the user is a winner by comparing a participation identifier to the list of winning participant numbers.

The gaming service 102 can determine a current view number of the video advertisement in step 216. For example, the gaming service 102 can maintain a counter of the number of times the video advertisement has been requested and delivered to participating users. In some instances, incidental views of the video advertisement by other parties who are not participating users may not be included in the view count. The gaming service 102 could track the number of times the video advertisement has been viewed by participating users from an identifier or other indicative information included in the video advertisement. The gaming service 102 can obtain this information from the content delivery platform, such as a content player of a merchant website/service or from a third party content player. The current view number for a unique user is referred to as a participation identifier or contest identifier.

The gaming service 102 can compare the current view number of the participant to the list of winning participation numbers previously determined by the gaming service 102 in step 218. If the user is a winner, the gaming service 102 can provide a winning notification to the user in step 220. If the user is a winner, the gaming service 102 can provide a losing notification to the user in step 222. If the user is a winner, the gaming service 102 can deliver or cause the delivery of a prize to the user in step 224.

The winning notification could include a message of congratulations with a link to a prize. For example, the notification could include a message for the user to check their email. The prize can be randomly selected by the gaming service 102 or pre-assigned each of the winning numbers in the list of winning numbers.

It will be understood that causing the user to wait to participate in the gaming experience increase the likelihood that the user fully engages with the video advertisement. Thus, the video advertisement is played in its entirety. When the authentication token is received and validated by the gaming service 102, the gaming service 102 can determine the participation number for the user. That is, the delivery of the video advertisement determines the participation number that is assigned to the user by the gaming platform 102. For example, if the user is the 50th viewer of the video advertisement, the user is assigned the participation number of 50. The participation number can be referred to as a contest identifier in some embodiments. When the user is the 34th viewer of the video advertisement, the user is assigned the participation number of 34. The user assigned the participation number of 34 would be a winner; whereas the user assigned the participation number of 50 would be a loser. When a user is assigned a winning participation number but does not allow the video advertisement to play in its entirety, the user is not entitled to a prize. The gaming service 102 can select another participation number from the set of participation numbers so that a subsequent viewer/participant can have an opportunity to completely watch the video advertisement and receive a prize. In some embodiments, when a user is assigned a winning participation number but does not allow the video advertisement to play in its entirety, the gaming service 102 can cause the content delivery platform to display a message to the user that they would have been a winner if they would have completely watched the video advertisement.

The assignment of a participation number is a functionality that can be performed at the gaming service 102 level. The user may never know or be privy to their participation number. That is, the gaming service 102 can perform the winning/losing check transparently to the user.

Figure 3A:
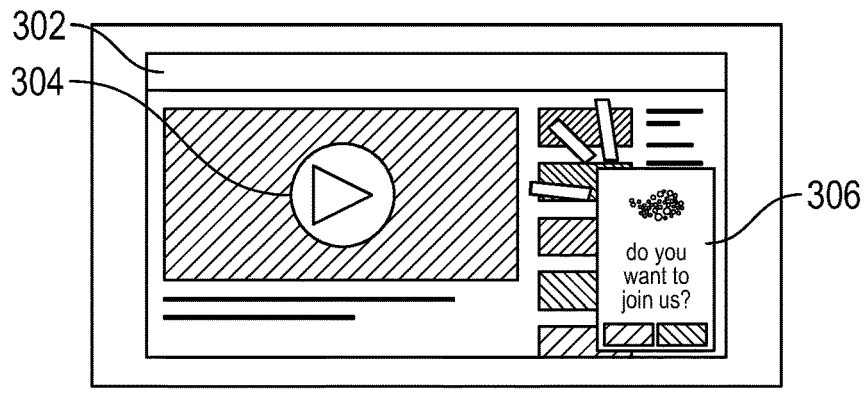
FIGS. 3A-3D collectively illustrates an example gaming experience delivered through a website.
Figure 3B:
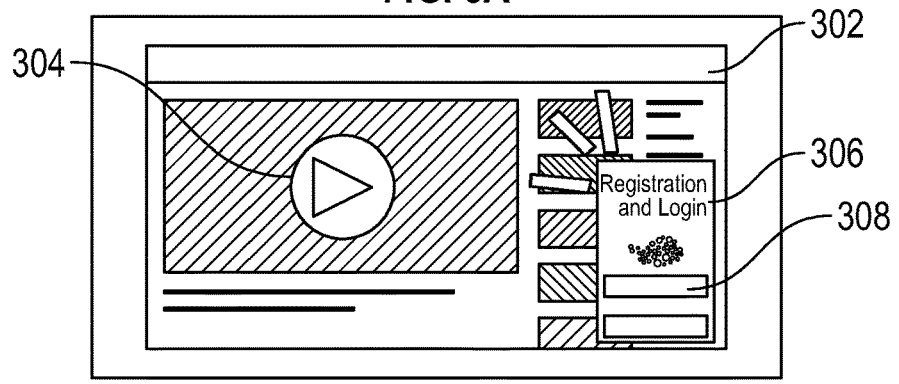

FIGS. 3A-3D collectively illustrates an example gaming experience delivered through a website. In FIG. 3A, a website 302 includes a content player 304. An offer to join in on a gaming experience is presented to the user in a frame or interface 306. The frame or interface can be presented as a popup. When the user chooses to participate, a login interface 308 is presented to the user in the frame or interface 306 as illustrated in FIG. 3B. The login and authentication process can proceed as disclosed above.

Figure 3C:
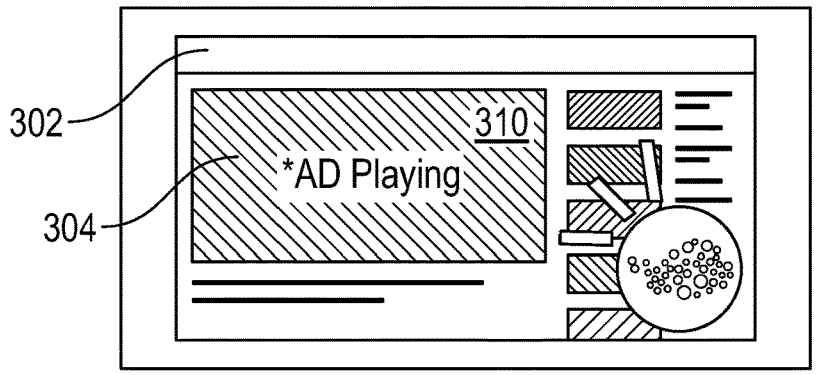
Figure 3D:
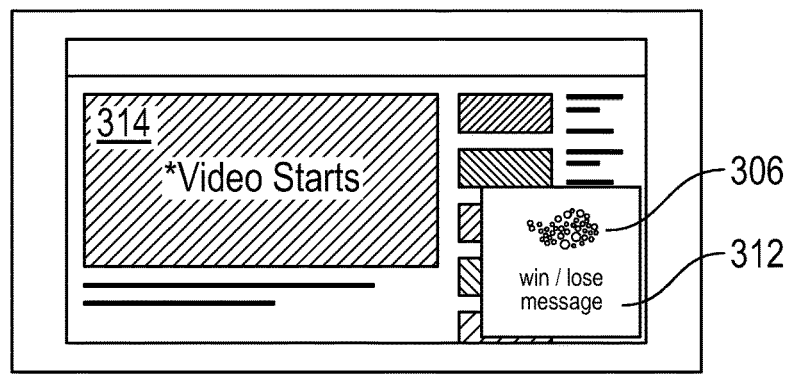

An advertisement 310 is presented inside the content player 304 as illustrated in FIG. 3C. Once the advertisement 310 is complete, a message 312 that indicates whether the user was a winner or a loser is presented in the frame or interface 306 as illustrated in FIG. 3D. Content, such as a requested video 314 can play after the advertisement 310.

FIG. 4 illustrates an example voice service-related embodiment where an advertisement and gaming experience are delivered to a user. The embodiment of FIG. 4 is visually depicted as an exchange of voice commands and responses. The user can activate a voice service assistant using a command 402. The user can specifically request to participate in a gaming experience of the present disclosure by using a voice command 404. For example, the user can submit a voice request to play a game. The voice service can provide a response 406 that confirms the request to play the game and an advertisement is triggered in response. An advertisement 408 is played to the user. The advertisement can include an audible advertisement. Completion of the audible advertisement can result in a trigger to ask the user to login to an account. For example, the voice service can output a message 410 that asks the user to login to their gaming service account. In one example sub-method 412, the user can provide a voice command that indicates that the user has an account. The voice service can ask for the user's login information in a voice response. The user can provide a voice command that includes their username and/or password. In another example sub-method 414, if the user indicates that they do not have an account, an account creation process can be facilitated as illustrated.

Once the user has logged in, the gaming experience can be delivered to the user. The gaming service processes the user's participant number using the comparison process described above (albeit for an audible advertisement). A voice response 416 can be delivered to the user informing them if they have won or lost. The voice response 416 can indicate to the user how they can obtain their prize if they are a winner.

Figure 5:
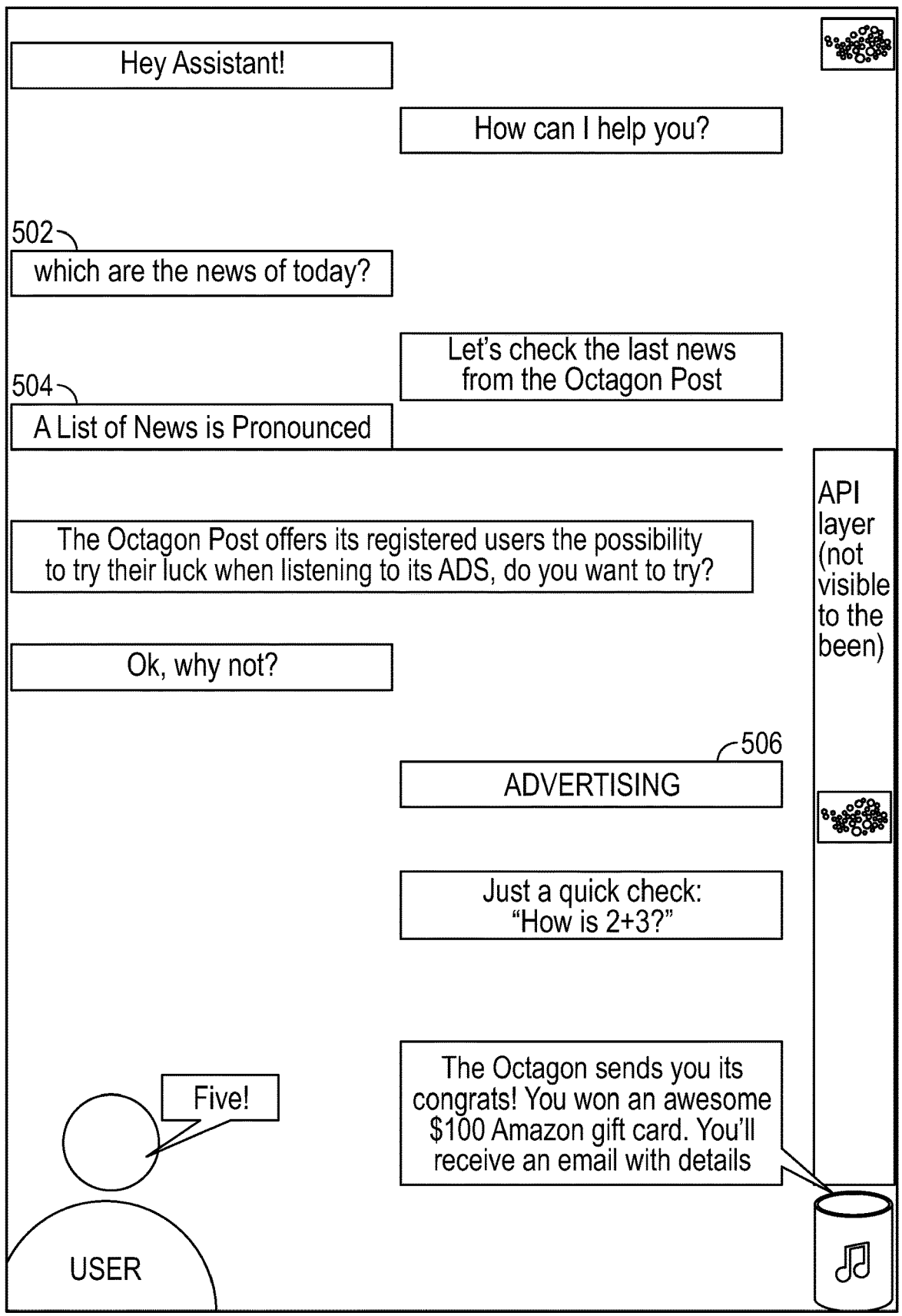
FIG. 5 illustrates an example voice service-related embodiment where an advertisement and gaming experience are delivered to a user.

FIG. 5 illustrates an example voice service-related embodiment where an advertisement and gaming experience are delivered to a user. In this flow, the user can provide a voice request 502 for content from a merchant, such as a news service. The voice service can provide an audio announcement 504 to the user that the merchant allows users to participate in a gaming experience in exchange for consuming advertisements. A login process can be completed prior to allowing the user to participate in the gaming experience after consuming an advertisement 506. Alternatively, the login process can be completed prior to delivering the results of the gaming experience to the user.

Figure 6:
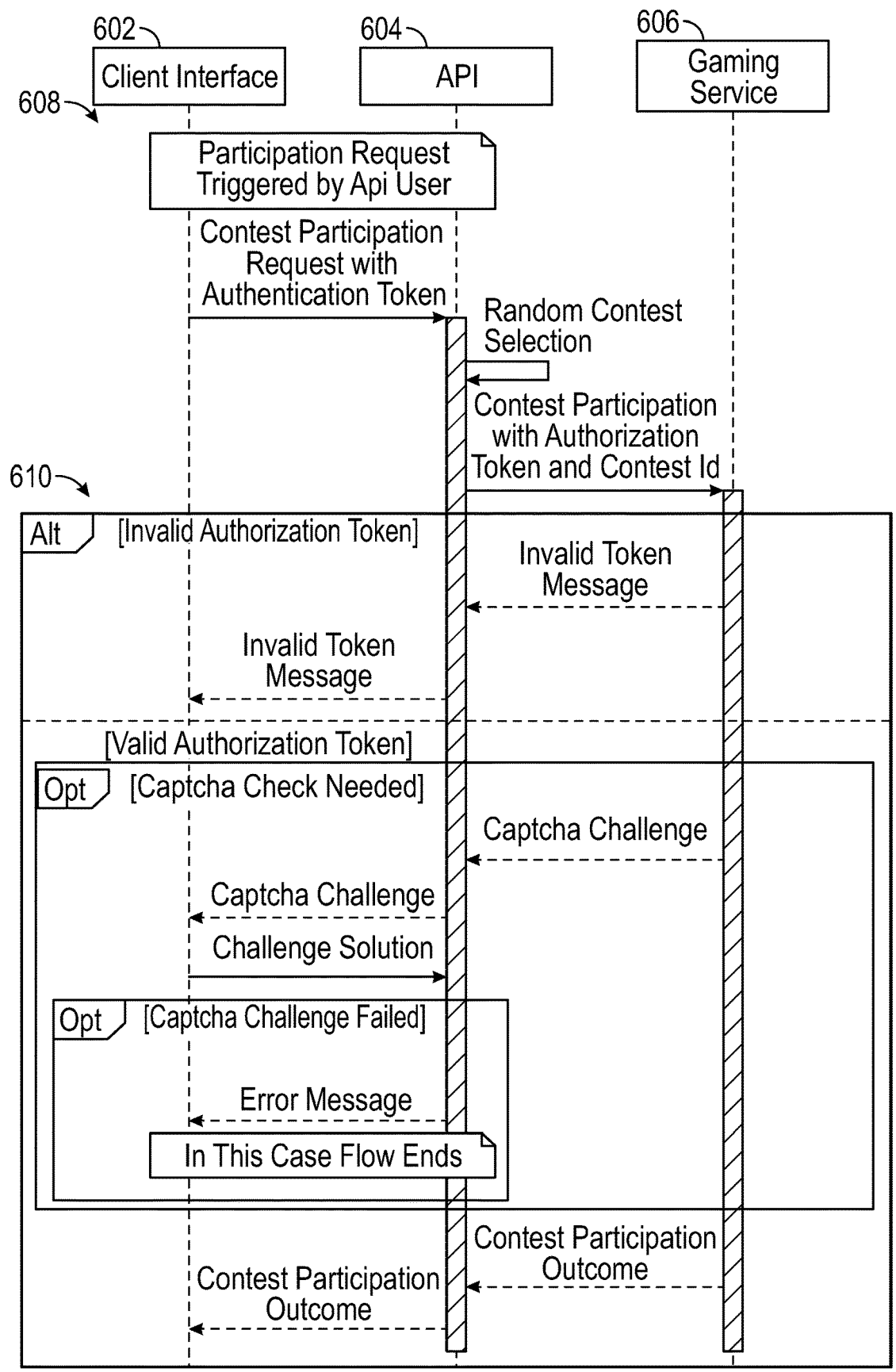
FIG. 6 is a signal flow diagram of an example gaming experience provided through an embodiment where an API is used to access a gaming service. The API can be used by any content delivery platform disclosed herein.

FIG. 6 is a signal flow diagram of an example gaming experience provided through an embodiment where an API is used to access a gaming service. The API can be used by any content delivery platform disclosed herein. The flow diagram can include a client interface 602 associated with a content delivery platform, which communicates through an API 604 with a gaming service 606 (also referred to herein as sweepstakes service). A participation request to participate in a gaming experience can be relayed from the client interface 602 to the gaming service 606 through the API 604. The participation request can be transmitted and includes the authentication token disclosed herein. A random content selection can be made between the API 604 and the gaming service 606. The participation request that includes the authentication token can be forwarded by the API 604 to the gaming service 606, along with a participation identifier. In some instances, the participation request does not include the participation identifier, but the participation identifier is determined at the time of game play.

The participation identifier is used to determine where the user is on the participation number list. For example, the user associated with the authorization token could be the tenth person to view or listen to an advertisement and their participation identifier would be ten. This information can be obtained and tracked by the content delivery platform. For example, the content delivery platform can determine a participation identifier for each user relative to an advertisement delivered to a user. As noted above, this can be determined using an incremental counting process. Each unique view from a unique user can be assigned a participation identifier by the content delivery platform that implements the client interface 602. That is, a unique user event is one in which a unique user consumes (e.g., watches, reads, listens) an advertisement completely (or at least partially in some instances). A plurality of pre-generated participant numbers may correspond to unique user requests for an advertisement.

A token validation process 608 can be implemented with responses being transmitted by the gaming service 606 to the client interface 602 through the API 604. In some instances, a captcha or other user validation process 610 can be performed. If the token validation process 608 and user validation process 610 are completed successfully, the results of the gaming experience can be related to the client interface 602 from the gaming service 606 through the API 604.

The signal flow diagram of FIG. 6 could also be used in a sweepstakes delivery method provided through an embodiment where an API is used to access a sweepstakes service. The API can be used by any content delivery platform disclosed herein. The flow diagram can include a client interface 602 associated with a content delivery platform, which communicates through an API 604 with a sweepstakes service 606. Prior to sweepstake creation, the sweepstakes service 606 can generate a list of winning participation numbers that correspond to select winners of a sweepstakes experience.

A participation request to participate in a sweepstakes experience can be relayed from the client interface 602 to the sweepstakes service 606 through the API 604. The participation request can be transmitted along with the authentication token disclosed herein if the user is already logged into sweepstakes service. If it is not logged may be requested to perform a login. If the user does not have an account registered with the sweepstakes service, the user can be prompted to create an account.

The participation request and authentication token can be forwarded by the API 604 to the sweepstakes service 606. A token validation process 608 can be implemented with responses being transmitted by the sweepstakes service 606 to the client interface 602 through the API 604. In some instances, a captcha or other user validation process 610 can be performed. If the token validation process 608 and user validation process 610 are completed successfully, the sweepstakes service 606 will generate the participation identifier (an incremental number) to determine where the user is on the participation number list.

If the participation identifier matches one of the plurality of pre-selected winning participation numbers, a graphical user interface (GUI) can be generated and populated with a message that informs the user that they are a winner, along with a prize description and an email is sent to the user with prize detail. Otherwise, a follow-on message can be displayed that prompts the user to attempt to try again soon. The results of the sweepstakes experience can be related to the client interface 602 from the sweepstakes service 606 through the API 604.

Some embodiments can include delivering a gaming experience through a set-top-box or a smart television or other similar appliance such as a web-enabled refrigerator. In some embodiments, a set-top-box or television can deliver content to a user that can be interrupted with an advertising break or commercial break. In some instances, the set-top-box or television mediates the delivery of the advertising break or commercial break and device knows when the advertising break or commercial break has ended. Prior to the advertising break or commercial break, the set-top-box or a smart television can deliver to the user an offer to play a game of chance. The user can proceed through the aforementioned authentication steps. The advertising break or commercial break occurs and at an end of the advertising break or commercial break, a gaming experience occurs through use of a gaming service as disclosed herein. The gaming service can determine if the user is a winner and deliver a notification to the user through a user interface provided by the set-top-box or a smart television.

Figure 7:
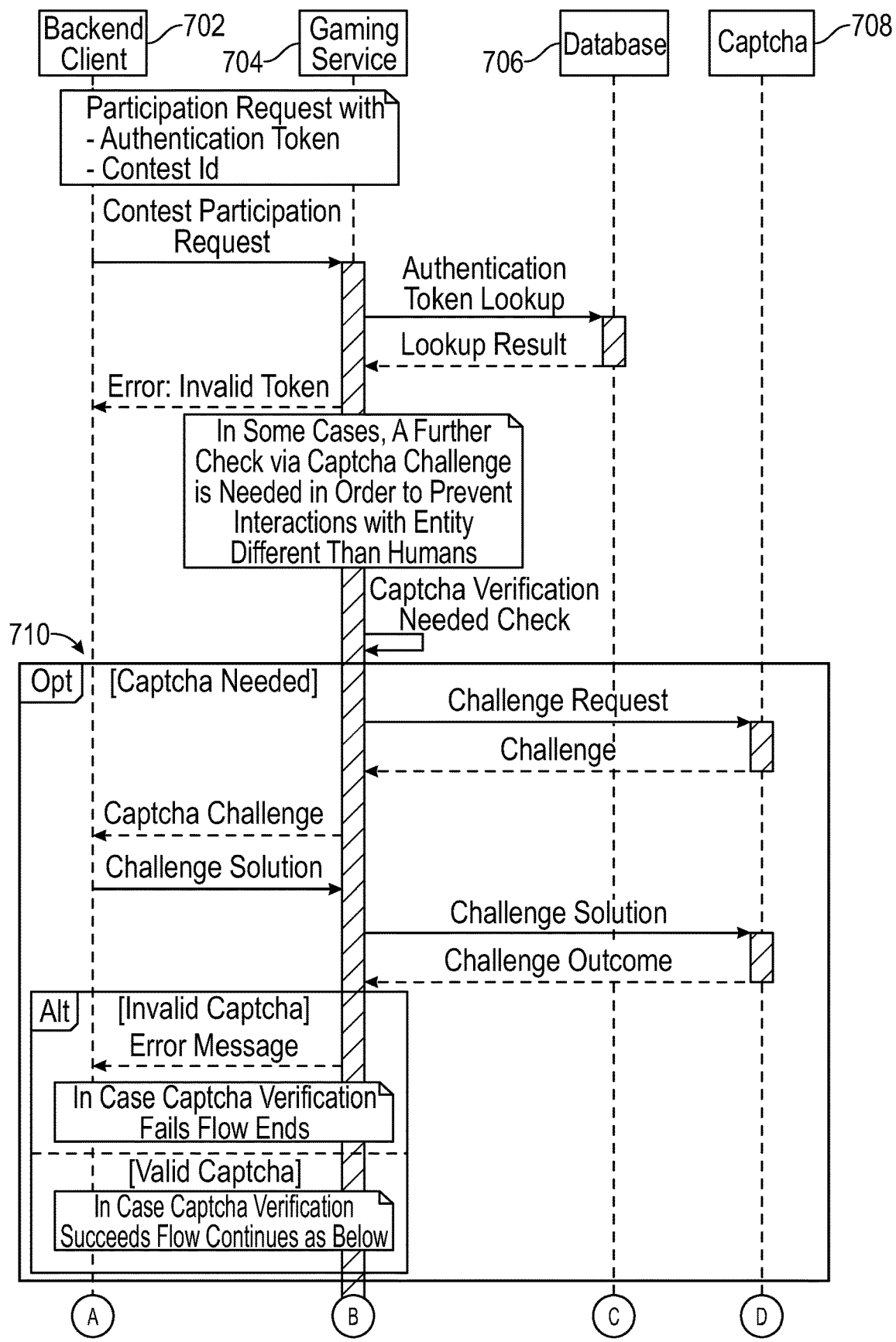
FIG. 7 is another example signal flow diagram of an example gaming experience.
Figure 7:
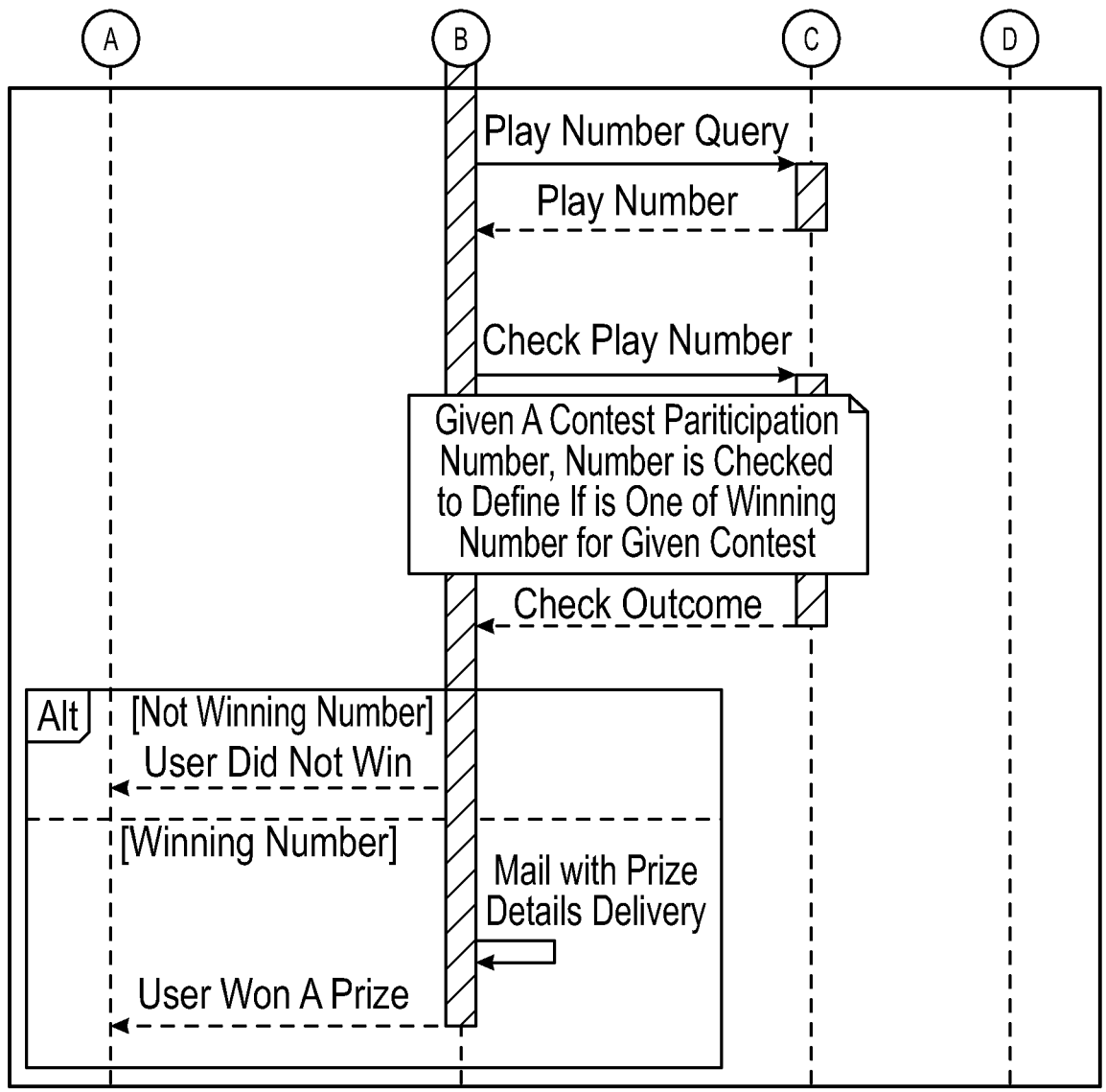

FIG. 7 is another example signal flow diagram of an example gaming experience. A backend client 702, gaming service 704, database 706, and captcha provider 708 can cooperate to provide a gaming experience that does not specifically require SDK or API implementation. A participation request can be transmitted from the backend client 702 to the gaming service 704. The participation request can include an authentication token and participation identifier. The gaming service 704 can perform a validation of the authentication token by performing a lookup operation at the database 706. If the authentication token is invalid, a message is related from the gaming service 704 to the backend client 702. A captcha process 710 can be facilitated through the gaming service 704 to the backend client 702.

When the authentication token and captcha process are successful, the backend client 702 can deliver an advertisement to a user. In some instances, the advertisement has been delivered to the user prior to the participation request being generated.

The gaming service 704 can determine if the user is a winner or loser using a lookup process with the database 706. As noted in the examples provided throughout. The gaming service 704 can create participant numbers that identify winners and losers for a gaming experience. These participant numbers can be stored in the database 706. The gaming experience utilizes the participation identifier. As noted, the participation identifier is used to determine where the user is on the participation number list. For example, the user associated with the authorization token could be the tenth person to view or listen to an advertisement. The gaming service 704 can compare the participation identifier with the winning participation numbers stored in the database 706. If a match is found, the user is determined to be a winner. If no match is found, the user is determined to be a loser.

A response is relayed back to the backend client 702 that reveals if the user is a winner or loser. The backend client 702 could present this response to the user in a content player or through a voice service.

Figure 8:
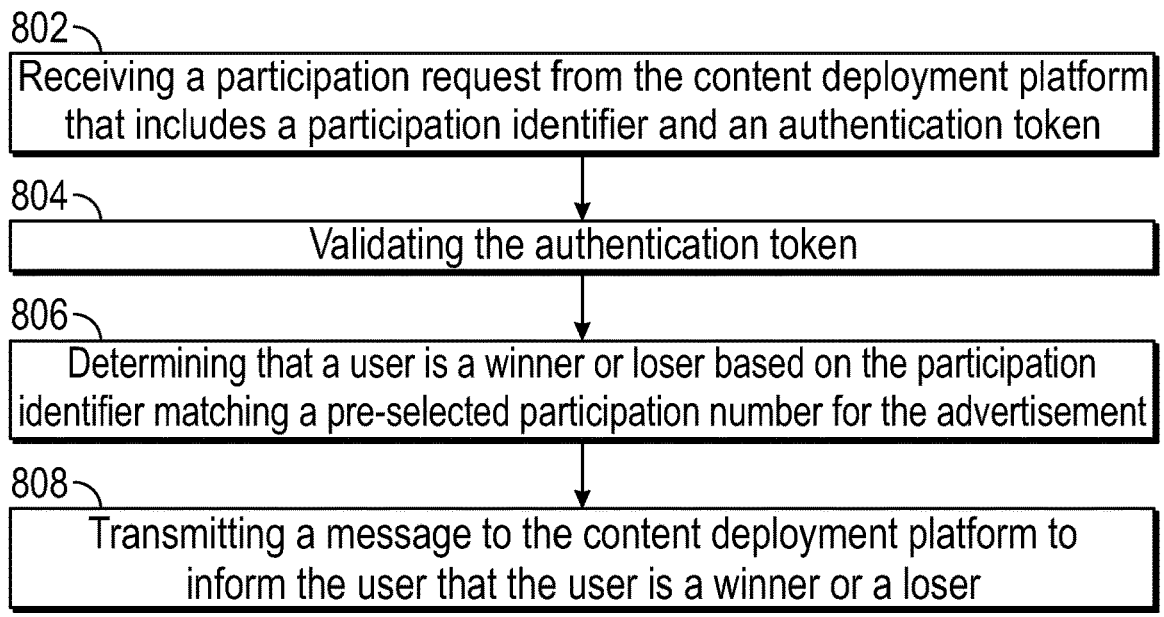
FIG. 8 is a flowchart of an example method of the present disclosure.

FIG. 8 is a flowchart of an example method of the present disclosure. The method includes a step 802 of receiving a participation request from the content deployment platform that includes a participation identifier and an authentication token. To be sure, the participation identifier is indicative of a current view number of an advertisement presented to the user. The method can further include a step 804 of validating the authentication token, along with a step 806 of determining that a user is a winner or loser based on the participation identifier matching a pre-selected winning participation number for the advertisement. Next, the method can include a step 808 of transmitting a message to the content deployment platform to inform the user that the user is a winner or a loser.

In some embodiments, the participation request is generated after an advertisement has been presented to the user. In one embodiment, the method can include transmitting an advertisement for display on the content deployment platform, as well as determining that the advertisement has been played until an end of the advertisement. The participation request is received at the end of the advertisement.

The method can also include validating the user using a user validation process, such as captcha. The method can include generating a plurality of pre-selected participant numbers for the advertisement. The plurality of pre-selected winning participation numbers corresponds to unique user requests for the advertisement. The method can also include comparing the participation identifier to the plurality of pre-selected winning participant numbers.

Figure 9:
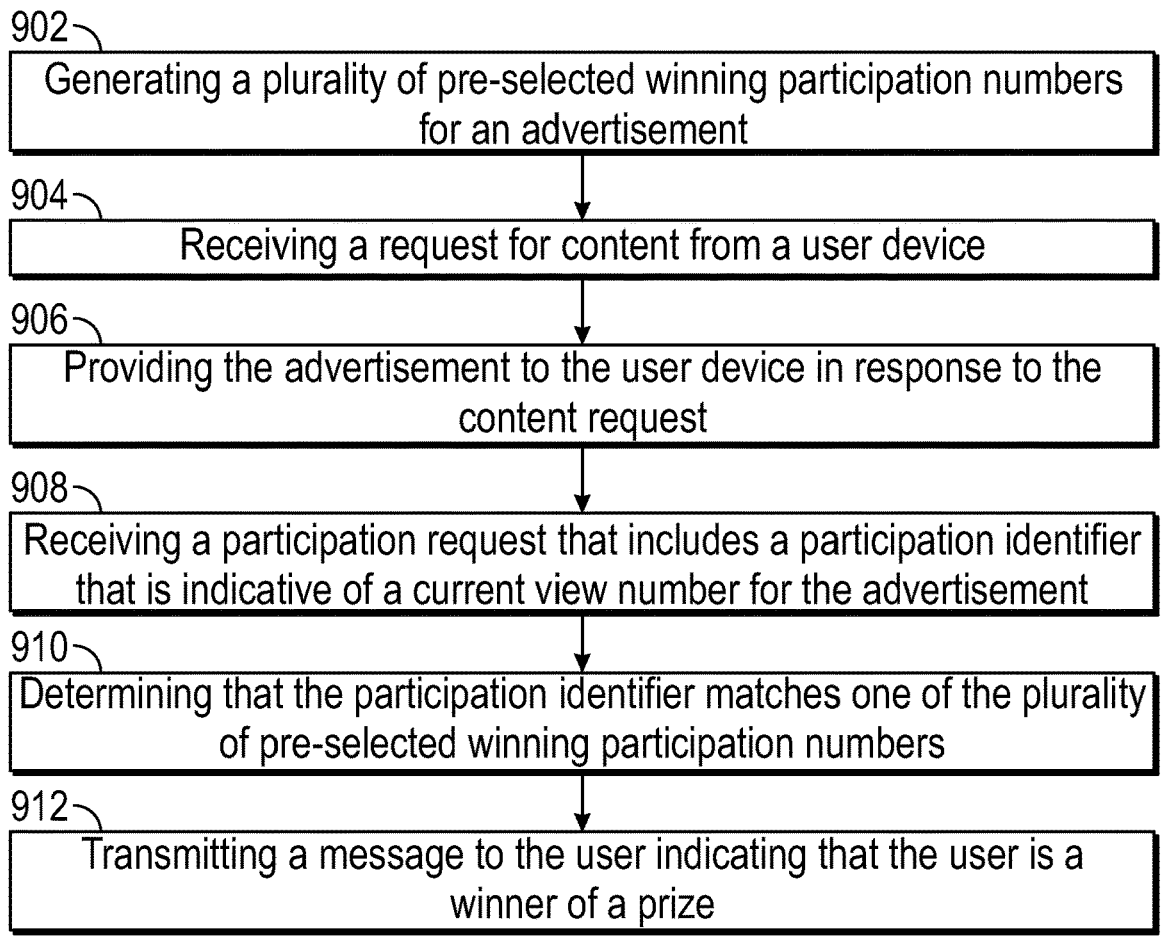
FIG. 9 is a flowchart of another example method of the present disclosure.

FIG. 9 is a flowchart of another example method of the present disclosure. The method can include as step 902 of generating a plurality of pre-selected winning participation numbers for an advertisement. To be sure, each of the plurality of pre-selected winning participation numbers corresponds to unique user requests for the advertisement. Further, the plurality of pre-selected winning participation numbers are a subset of a set of participant numbers for the advertisement. The method can include a step 904 of receiving a request for content from a user device, along with a step 906 of providing the advertisement to the user device in response to the content request.

In one embodiment, the method can include a step 908 of receiving a participation request that includes a participation identifier that is indicative of a current view number for the advertisement. The method can further include a step 910 of determining that the participation identifier matches one of the plurality of pre-selected winning participation numbers. In some embodiments, the method includes a step 912 of transmitting a message to the user indicating that the user is a winner of a prize.

In some instances, authenticating the user can occur after determining that the participation identifier matches one of the plurality of pre-selected winning participation numbers, but prior to transmitting the message to the user indicating that the user is a winner of a prize. In various embodiments, the method can include authenticating the user includes evaluating an authentication token that was provided to the user after a login event, as well as delivering the initial content that was requested by the user, such as a news story, a video, a song, and the like.

Figure 10:
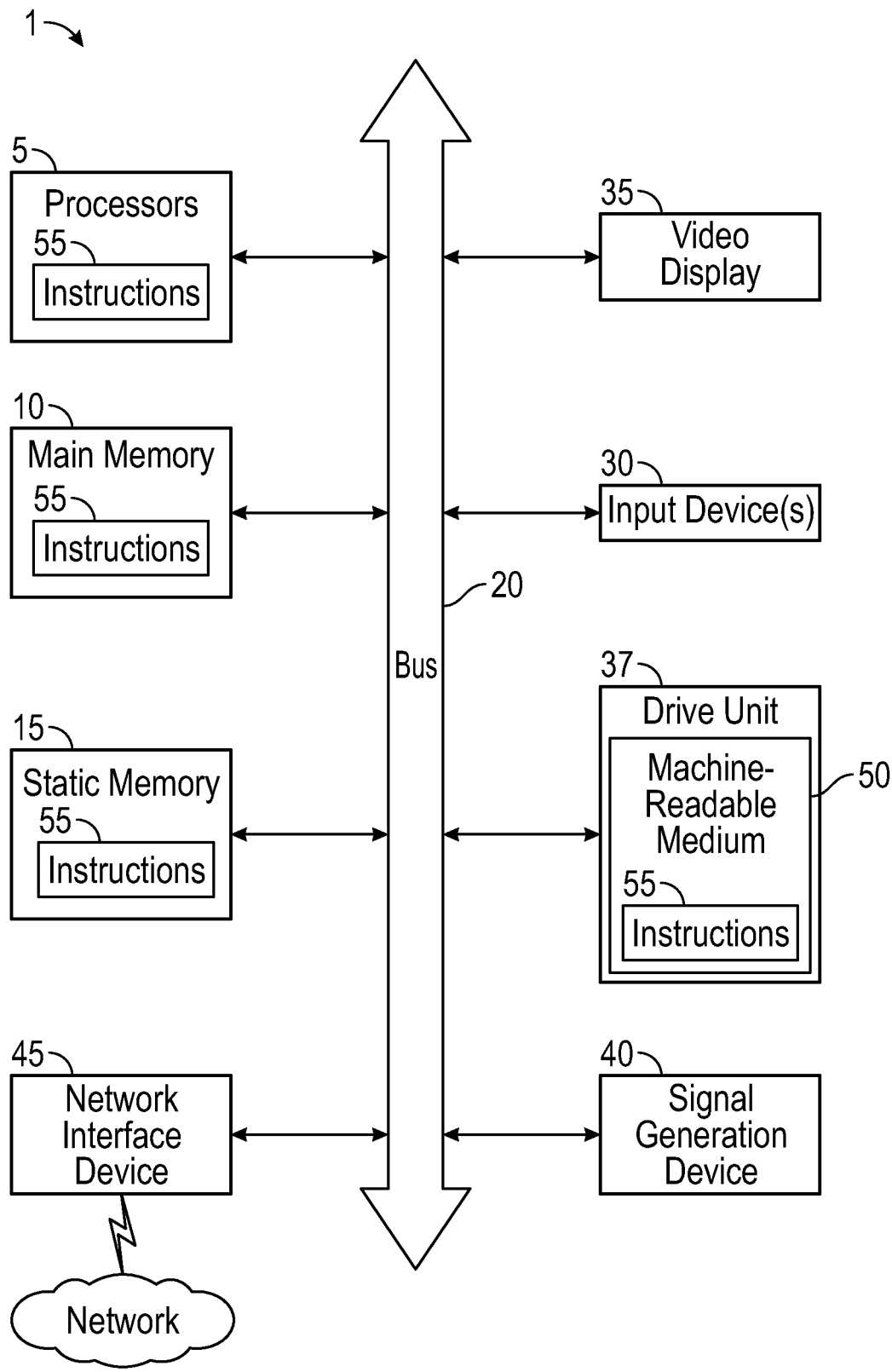
FIG. 10 is a schematic diagram of an exemplary computer system that is used to implement embodiments according to the present technology.

FIG. 10 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 of FIG. 10 are those typically found in computer systems that may be suitable for use with embodiments of the present disclosure and are intended to represent a broad category of such computer components that are well known in the art. Thus, the computer system 1 of FIG. 10 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls. The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
    receiving a participation request from both a gaming service and a content deployment platform, the content deployment platform having a voice service; the participation request includes a participation identifier and an authentication token, wherein the participation identifier is indicative of a current view number of an advertisement presented to a user and completely consumed by the user;
    validating the authentication token;
    generating a plurality of pre-selected winning participation numbers for the advertisement, wherein the plurality of pre-selected winning participation numbers correspond to unique vocal user requests for the advertisement and the plurality of pre-selected winning participation numbers being randomly selected from a set of participation numbers using a random number generator;
    comparing the participation identifier to the plurality of pre-selected winning participation numbers;
    determining that a user is a winner or loser of a game based on the participation identifier matching a pre-selected winning participation number for the advertisement; and
    transmitting a vocal message to the content deployment platform to inform the user that the user is a winner or a loser; for the winner, generating a graphical user interface, populating the graphical user interface with a message that informs the user that they are a winner, along with a prize description and an email sent to the winner with prize detail; for the loser, generating a graphical user interface and populating it with a message to try again soon; and further comprising authenticating the user after the determining that the participation identifier matches one of the plurality of pre-selected winning participation numbers, but prior to transmitting the message to the user indicating that the user is a winner of a prize.

2. The method according to claim 1, wherein the participation request is generated after an advertisement has been presented to the user.

3. The method according to claim 1, wherein the participation request is transmitted at an end of the advertisement.

4. The method according to claim 1, further comprising:
transmitting an advertisement for display on the content deployment platform; and
determining that the advertisement has been played until an end of the advertisement, wherein the participation request is received at the end of the advertisement.

5. The method according to claim 1, further comprising validating the user using a user validation process.

6. The method according to claim 1, further comprising:
authenticating the user;
transmitting an authentication token to a content deployment platform; and
receiving the authentication token as a part of the participation request.

7. A system, comprising:
a processor; and
a memory for storing instructions, the processor executing the instructions to:
receive a participation request from both a gaming service and a content deployment platform, the content deployment platform having a voice service; the participation request includes a participation identifier and an authentication token, wherein the participation identifier is indicative of a current view number of an advertisement presented to a user and completely consumed by the user;
validate the authentication token;
generate a plurality of pre-selected winning participation numbers for the advertisement, wherein the plurality of pre-selected winning participation numbers correspond to unique vocal user requests for the advertisement and the plurality of pre-selected winning participation numbers being randomly selected from a set of participation numbers using a random number generator;
compare the participation identifier to the plurality of pre-selected winning participation numbers;
determine that a user is a winner or loser based on the participation identifier matching a pre-selected winning participation number generated for the advertisement; and
transmit a vocal message to the content deployment platform to inform the user that the user is a winner or a loser; for the winner, generating a graphical user interface, populating the graphical user interface with a message that informs the user that they are a winner, along with a prize description and an email sent to the winner with prize detail; f or the loser, generating a graphical user interface and populating it with a message to try again soon; and further comprising authenticating the user after the determining that the participation identifier matches one of the plurality of pre-selected winning participation numbers, but prior to transmitting the message to the user indicating that the user is a winner of a prize.

8. The system according to claim 7, wherein the content deployment platform and the system are communicatively coupled over an application programming interface.

9. The system according to claim 7, wherein the content deployment platform:
presents an advertisement to the user;
determines that the user has completely consumed the advertisement; and
generates the participation request after the advertisement has been completely consumed.

10. The system according to claim 7, wherein the pre-selected winning participation numbers are generated prior to providing the advertisement.

11. The system according to claim 7, wherein the processor is configured to:
transmit an advertisement for display on the content deployment platform; and
determine that the advertisement has been played until an end of the advertisement, wherein the participation request is received at the end of the advertisement.

12. The system according to claim 7, wherein the processor is configured to validate the user using a user validation process.

13. The system according to claim 7, wherein the processor is configured to:
authenticate the user;
transmit an authentication token to a content deployment platform; and
receive the authentication token as a part of the participation request.

14. The system according to claim 7, wherein the content deployment platform includes any of a website, an application that executes on a mobile device, a voice service, or combinations thereof.

15. A method, comprising:
generating a plurality of pre-selected winning participation numbers for an advertisement and the plurality of pre-selected winning participation numbers being randomly selected from a set of participation numbers using a random number generator, each of the plurality of pre-selected winning participation numbers corresponding to unique vocal user requests for the advertisement, the plurality of pre-selected winning participation numbers being a subset of a set of participation numbers for the advertisement;
receiving a request for content from a user device;
providing the advertisement to the user device in response to the content request;
receiving a participation request from both a gaming service and a content deployment platform, the content deployment platform having a voice service; the participation request includes a participation identifier that is indicative of a current view number f or the advertisement as completely consumed by a user;
determining that the participation identifier matches one of the plurality of pre-selected winning participation numbers;
transmitting a vocal message to the user indicating that the user is a winner of a prize; and for the winner, generating a graphical user interface, populating the graphical user interface with a message that informs the user that they are a winner, along with a prize description and an email sent to the winner with prize detail; and further comprising authenticating the user after the determining that the participation identifier matches one of the plurality of pre-selected winning participation numbers, but prior to transmitting the message to the user indicating that the user is a winner of a prize.

16. The method according to claim 15, wherein authenticating the user includes evaluating an authentication token that was provided to the user after a login event.

17. The method according to claim 15, further comprising delivering the content to the user.

\* \* \* \* \*